United States Patent [19]
Avis et al.

[11] Patent Number: 4,779,262
[45] Date of Patent: Oct. 18, 1988

[54] CONNECTION OF SUBSCRIBER COMMUNICATION NETWORK BASE STATION TO EXTERNAL INFORMATION NETWORK

[75] Inventors: Graham M. Avis; Terrance S. Collins; Martin K. Schroeder, all of San Diego, Calif.; Brian G. Kiernan, Voorhees, N.J.; Jonathan W. Mechling, Annapolis, Md.

[73] Assignee: International Mobile Machines Corp., Philadelphia, Pa.

[21] Appl. No.: 921,656

[22] Filed: Oct. 21, 1986

[51] Int. Cl.⁴ ............................................... H04J 3/02
[52] U.S. Cl. ......................................... 370/50; 455/33
[58] Field of Search ...................... 379/56, 58, 59, 60, 379/63; 370/50, 77, 112, 95, 109; 455/54, 56, 33

[56] References Cited
U.S. PATENT DOCUMENTS

| | | | |
|---|---|---|---|
| 3,959,595 | 5/1976 | Smith | 370/50 |
| 4,071,711 | 1/1978 | Beaupre et al. | 370/112 |
| 4,675,863 | 6/1987 | Paneth et al. | 370/50 |

OTHER PUBLICATIONS

G. S. Bhusri, "Considerations for ISDN Planning and Implementation", Jan. 1984, vol. 22, No. 1, IEEE Communications Magazine, pp. 18–32.

Primary Examiner—Douglas W. Olms
Assistant Examiner—Melvin Marcelo
Attorney, Agent, or Firm—Arthur A. Jacobs; Edward W. Callan

[57] ABSTRACT

A base station in a subscriber communication network for communicating signals between subscriber stations and an external communication network having a plurality of ports. The base station includes a communication circuit for enabling simultaneous communications between a plurality of the ports and a plurality of subscriber stations over a given communication channel having multiple sequentially repetitive time slots; a remote-connection processor for directing communications between the time slot assigned to a given subscriber station and a given external communication network port; and an exchange for connecting the communication circuit to the external communication network ports. The exchange includes a central concentrator for directing signals from predetermined external network ports to predetermined sequentially repetitive time slots in a bit stream generated by the central concentrator, and for directing signals to predetermined external network ports from predetermined sequentially repetitive time slots in a bit stream received by the central concentrator; and the remote-connection processor directs signal transfer between given sequentially repetitive time slots of the bit streams and given sequentially repetitive time slots of the communication channel. The remote-connection processor includes a remote concentrator for directing signals from predetermined remote ports to predetermined sequentially repetitive time slots in a bit stream generated by the remote concentrator and transmitted to the central concentrator, and for directing signals to predetermined remote ports from predetermined sequentially repetitive time slots in the bit stream generated by the central concentrator.

4 Claims, 2 Drawing Sheets

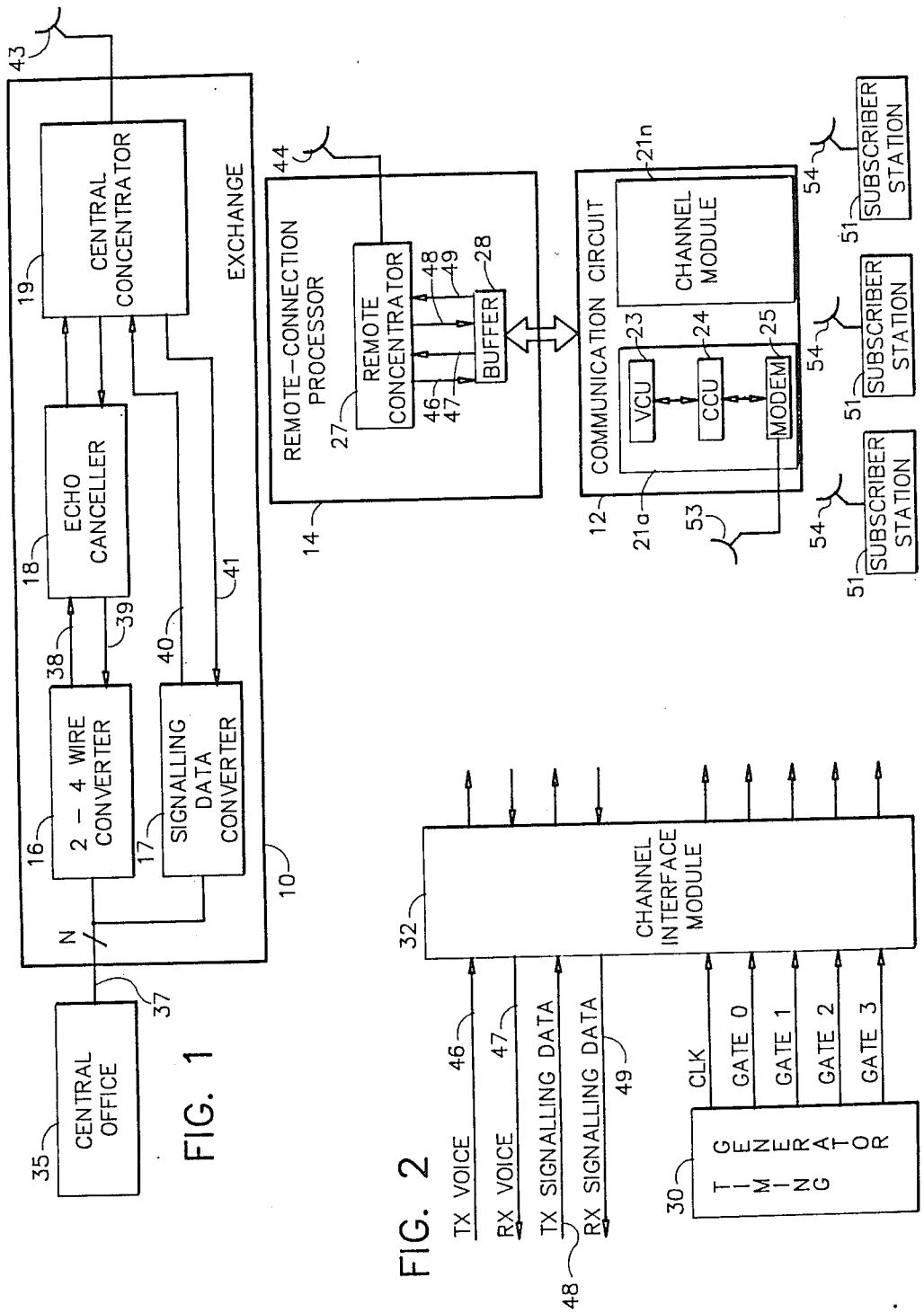

CONNECTION OF SUBSCRIBER COMMUNICATION NETWORK BASE STATION TO EXTERNAL INFORMATION NETWORK

BACKGROUND OF THE INVENTION

The present invention generally pertains to communications systems and is particularly directed to an improvement in connecting a subscriber communication network base station to an external communication network having a plurality of ports.

A known prior art base station in a subscriber communication network for communicating signals between subscriber stations and an external communication network having a plurality of ports, includes a communication circuit for enabling simultaneous communications between a plurality of the ports and a plurality of subscriber stations over a given communication channel having multiple sequentially repetitive time slots, with predetermined time slots being assigned respectively to predetermined subscriber stations; a remote-connection processor for directing communications between the time slot assigned to a given subscriber station and a given port; and an exchange for connecting the communication circuit to the ports. The exchange includes a switch which responds to a control signal from the remote-connection processor by physically connecting a selected port to a selected communication channel time slot assigned to a given subscriber station. Such a prior art base station is described in copending U.S. patent application No. 713,925, filed Mar. 20, 1985 now issued as U.S. Pat. No. 4,675,863, dated June 23, 1987.

SUMMARY OF THE INVENTION

The present invention provides an improved base station of the type generally described above, except that the exchange does not include such a switch. The base station of the present invention is characterized by the exchange including a central concentrator for directing signals from predetermined external network ports to predetermined sequentially repetitive time slots in a bit stream generated by the central concentrator, and for directing signals to predetermined external network ports from predetermined sequentially repetitive time slots in a bit stream received by the central concentrator; and by the remote-connection processor directing signal transfer between given sequentially repetitive time slots of the bit streams and given sequentially repetitive time slots of the communication channel.

The base station of the present invention is further characterized by the remote-connection processor comprising a remote terminal concentrator for directing signals from predetermined remote ports to predetermined sequentially repetitive time slots in a bit stream generated by the remote concentrator and transmitted to the central concentrator, and for directing signals to predetermined remote ports from predetermined sequentially repetitive time slots in the bit stream generated by the central concentrator; and a buffer unit connected to the remote ports for directing signals between predetermined remote ports and predetermined communication channel time slots.

Because the exchange of the base station of the present invention communicates with the communication circuit by generating and receiving bitstreams as described above, it is practical to locate the exchange of the base station of the present invention remotely from the communication circuit of the base station since the bitstream may be transmitted between the exchange and the communication circuit over appreciable distances by microwave.

Additional features of the present invention are described with reference to the description of the preferred embodiment.

BRIEF DESCRIPTION OF THE DRAWING

FIG. 1 is a block diagram of a preferred embodiment of the base station of the present invention.

FIG. 2 is a block diagram of a buffer unit included in the buffer of the base station of FIG. 1 for interfacing with a single channel module.

DESCRIPTION OF THE PREFERRED EMBODIMENT

Figure 3:
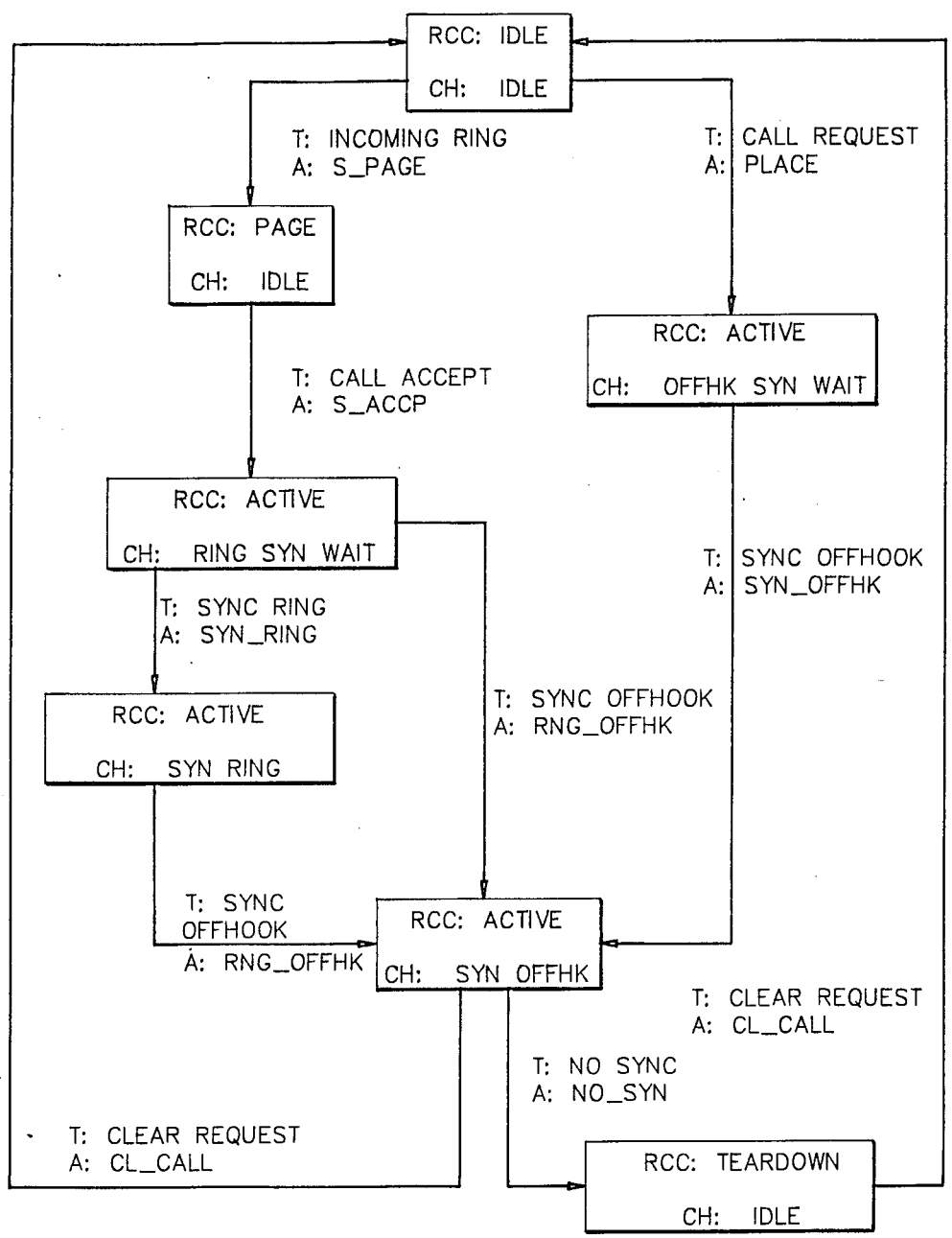
FIG. 3 is a state diagram illustrating normal call processing flow in the base station of FIG. 1.

The preferred embodiment of the base station of the present invention is used in a subscriber telephone system.

Referring to FIG. 1, a preferred embodiment of the base station of the present invention includes an exchange 10, a communication circuit 12 and a remote-connection processor 14. The communication circuit 12 and the remote control processor 14 are located remotely from the exchange 10.

The exchange 10 includes a two-to-four wire converter 16, a signalling data converter 17, an echo canceller 18, and a central concentrator 19. The communication circuit 12 includes a plurality of channel modules 21a, ..., 21n. Each channel module 21 includes a voice codec unit (VCU) 23, a channel control unit (CCU) 24 and a modem 25. The remote-connection processor 14 includes a remote concentrator 27 and a buffer unit 28.

Referring to FIG. 2, the buffer unit 28 includes a timing generator 30 and a channel interface module 32.

Referring again to FIG. 1, the exchange 10 is connected to a plurality of ports of a central office 35 by N pairs of lines 37. "N" is the number of subscriber stations being served by the base station. Each pair of lines 37 provides a 2-wire loop appearance. Each line pair 37 is connected to both the two-to-four wire converter 16, and the signalling data converter 17. Unidirectional signal flow takes place on the line pairs 38–41 on the other sides of the converters 16, 17, with 4-wire loop appearances being provided on the combination of N line pairs 38 and N line pairs 39. Transmitted voice signals are provided on line pairs 38; received voice signals are provided on line pairs 39; transmitted signalling data is provided on line pairs 40; and received signalling data is provided on line pairs 41.

The transmitted and received voice signals are communicated between the two-to-four wire converter 16 and the central concentrator 19 through the echo canceller 18. The signalling data is communicated directly between the converter 17 and the central concentrator 19.

The central concentrator 19 is a Model 1218C concentrator sold by ITT Corp.

The central concentrator 19 directs signals from predetermined line pairs 38–41 (which are connected to predetermined external network ports in the central office 35) to predetermined sequentially repetitive time slots in a bit stream generated by the central concentrator 19. The central concentrator 19 also directs signals to predetermined external network ports in the central office via predetermined line pairs 38-41 from predetermined sequentially repetitive time slots in a bit stream received by the central concentrator 19. The central concentrator transmits and receives such bit streams via a microwave antenna 43.

These bit streams are communicated between the antenna 43 and a microwave antenna 44 connected to the remote concentrator 27 contained in the remote-connection processor 14. The remote concentrator 27 has a plurality of remote ports connected to the buffer 28 by line pairs 46-49.

The remote concentrator 27 is a Model 1218S concentrator sold by ITT Corp.

The remote concentrator 27 directs signals from predetermined remote terminals (which are connected to predetermined line pairs 46-49) to predetermined sequentially repetitive time slots in a bit stream generated by the remote concentrator 27. The remote concentrator 27 also directs signals to predetermined remote ports from predetermined sequentially repetitive time slots in the bit stream received by the remote concentrator 27 from the central concentrator 19.

The transmitted voice signals are provided on line pairs 46; the received voice signals are provided on line pairs 47; the transmitted signalling data is provided on line pairs 48; and the received signalling data is provided on the line pairs 49.

The buffer 28 interfaces the remote concentrator 27 with the communication circuit 12.

As described above, the communication circuit 12 includes a plurality of channel modules 21. Each channel module 21 communicates with a given number of subscriber stations 51 over a given communication channel having an assigned frequency and further having multiple sequentially repetitive time slots. Communication between each channel module 21 and the base station 51 is via a microwave link between a base station antenna 53 and antennas 54 located at each subscriber station. Predetermined time slots are assigned to predetermined subscriber stations 51. In the preferred embodiment, there are three subscriber stations 51 coupled to each channel module 19 over each discrete frequency communication channel. Each subscriber station 51 has a telephone connected thereto.

In each channel module 21, the VCU 123 includes a separate voice codec (not shown) for each subscriber station 51 and an additional codec for communicating signalling data to and from all three subscriber stations. The CCU 24 assigns the signals communicated through the codecs of the VCU 23 to different time slots of the communication channel assigned to the given channel module 21. These signals are communicated between the CCU 24 and the base station antenna 53 via the modem 25 and additional signal conditioning components (not shown) adapted for transmitting and receiving these signals over the discrete communication channel at the assigned frequency. Thus, each subscriber station 51 communicates voice signals with the base station over its own predetermined time slot and communicates signalling data with the base station over a predetermined time slot that is common to all three subscriber stations. Communication between the base station and the subscriber stations is controlled by a radio control unit (RCU) software process implemented by a microcomputer in the CCU 24.

The RCU is programmed to recognize three predetermined subscriber stations corresponding to three predetermined line appearances provided by the connections between the remote concentrator 27 and a given channel module 21.

Control processing in the RCU is organized using state machines. Input message tokens include signalling data from the remote concentrator 27, radio control channel (RCC) messages from the subscriber stations, and (simulated) baseband control channel (BCC) messages.

Table 1 is an RCC state table used to process messages from the remote concentrator 27 (Conc) and RCC messages from a subscriber station 51 (Sub).

TABLE 1

RCC STATES

| Token | Source | RCC Idle | Page | Active | Teardown | Ring |
|---|---|---|---|---|---|---|
| Call Request | Sub | place | s__null | fault | dis__sub | fault |
| Call Accept | Sub | s__onhk | s__accp | fault | dis__sub | fault |
| Clear Request | Sub | s__clrq | dis__sw | cl__call | cl__call | s__onhk__a |
| Incoming Ring | Conc | s__page | s__null | fault | s__null | s__null |
| Incoming Idle | Conc | s__null | s__onhk | s__null | s__null | s__onhk__r |
| RCC Timeout | | s__null | s__clrq__t | s__null | cl__call__t | s__null |

TABLE 2

CHANNEL STATES

| Token | Chnl Idle | Ring Syn Wait | Offhk Syn Wait | Syn Ring | Syn Offhk |
|---|---|---|---|---|---|
| No Sync | s__null | no__syn | no__syn | no__syn | no__syn |
| Sync Onhook | ch__err | s__null | s__null | s__null | s__null |
| Sync Offhook | ch__err | rng__offhk | syn__offhk | rng__offhk | ch__stat |
| Sync Ring | ch__err | syn__ring | hook__err | ch__stat | hook__err |
| Sync Data | ch__err | ch__err | hook__err | ch__err | hook__err |

The normal call processing logic flow is shown in FIG. 3. All possible RCC and channel state combinations are listed, as well as the input token (T) and the resulting action (A) required to transition from one state to another.

The following group of descriptions define the RCC state transition routines which are called whenever a RCC token is received by a CCU, whether from a subscriber station or the remote concentrator.
Clear Call (cl__call)
Current State: Active, Teardown
Token: Clear Request
Next State (RCC): RCC Idle
Next State (CHAN): Chnl Idle
Messages:

Conc: Place circuit in idle state.
RCC: None.
CCU: Change channel (onhook) is sent to the CCU.
Actions:

This routine is invoked whenever a subscriber station generates a Clear Request. The channel state is set to Chnl Idle. The clear-request timer is cancelled. Whether or not teardown was in progress, the RCU conciders the subscriber station available for another call, and returns the RCC state to RCC Idle.

Clear Call Timeout (cl_call_t)
Current State: Teardown
Token: RCC Timeout
Next State (RCC): RCC Idle
Next State (CHAN): Chnl Idle
Messages:
 Conc: Set Circuit to idle state.
 RCC: None.
 CCU: Change Channel (ONHOOK) is sent to the CCU.
Actions:

When a Subscriber Station is in the Teardown state as a result of a No Sync message from the CCU, the RCU waits for a Clear Request message to set the RCC state to RCC Idle. If the Clear Request meassage is not received within the timeout period, this routine is invoked.

The routine performs the same functions as the cl_call routine, plus an error message is printed, and the RCC state is returned to RCC Idle.

Disconnect Subscriber (dis_sub)
Current State: Teardown
Token: Call Request, Call Accept
Next State (RCC): Teardown
Next State (CHAN): No state change
Messages:
 Conc: None.
 RCC: Clear Indication (Reorder)
 CCU: None.
Actions:

When a Subscriber Station is in the Teardown state, this indicates that the RCU is expecting a Clear Request token from the Subscriber Station, and no new calls to or from the Subscriber Station are allowed.

If a Call Request or Call Accept Message is received, it is assumed that the Clear Request is lost. The new token is cleared by sending a Clear Indication message with reorder status to the Subscriber Station, and the old call is cleared by invoking the cl_call routine.

Disconnect Switch (dis_sw)
Current State: Page
Token: Clear Request
Next State (RCC): RCC Idle
Next State (CHAN): No state change
Messages:
 Conc: Place circuit in idle state.
 RCC: None.
 CCU: None:
Action:

This routine is invoked when a Clear Request token is received from a Subscriber Station in response to a Page. The page timer is cancelled. The RCC state is set to RCC Idle to allow for new Call Request tokens.

Event Fault (fault)
Current State: Active ring
Token: Call request, call accept
Next State (RCC): No state change
Next State (CHAN): No state change
Messages:
 Conc: None.
 RCC: None.
 CCU: None.
Action:

This routine is invoked when the RCU receives a token which is invalid for the current RCC state. The Subscriber Station is left in the current state, and a diagnostic message is printed on a system console.

Place Call Origination (place)
Current State: RCC Idle
Token: Call Request
Next State (RCC): Active
Next State (CHAN): Offhk Syn Wait
Messages:
 Conc: Place circuit in loop state.
 RCC: Send Call Connect message to Subscriber Station.
 CCU: Send Change Channel (OFFHOOK).
Actions:

This routine is invoked when a Subscriber Station is in the RCC Idle state and the RCU receives a Cal Request token. A Change Channel message with an Offhook status is sent to the CCU, and a Call Connect message is sent to the Subscriber Station. The channel state of the allocated frequency is set to Offhk Syn Wait, and the RCC state is set to Active.

Subscriber Station Call Accept (s_accp)
Current State: Page
Token: Call Accept
Next State (RCC): Active
Next State (CHAN): Ring Syn Wait
Messages:
 Conc: Place circuit in loop state.
 RCC: Send Call Connect message.
 CCU: Send Change Channel (RING).
Actions:

This routine is invoked when the RCU receives a Call Accept token from a Subscriber Station that is in the Page state. The page timer is cancelled. A Change Channel message with Ring status is sent to the CCU, and a Call Connect message is sent to the Subscriber Station. The channel state is set to Ring Syn Wait, and the RCC state is set to Active.

Subscriber Station Clear Request Timeout (s_clrq_t)
Current State: Page
Token: RCC Timeout
Next State (RCC): RCC Idle
Next State (CHAN): No state change
Messages:
 Conc: None.
 RCC: None.
 CCU: None.
Actions:

This routine is invoked when a Subscriber Station is in the Page state and the RCU does not receive a response. The call teardown is performed by invoking the dis_sw routine, which leaves the RCC state in RCC Idle. A diagnostic message is printed on the system console.

Subscriber Station Null State Transition (s_null)
Current State: <any state>
Token: <any token>
Next State (RCC): No state change
Next State (CHAN): No state change
Messages:
 No messages are generated by this routine.
Actions:

This is the null transition routine. It performs no operations and generates no messages. It leaves a Subscriber Station in the same state as it was previously. It is a convenient way to gobble up tokens which have no effect on the current state.

Subscriber Station Onhook(s—onhk)
Current State: RCC Idle, Page
Token: Call Accept, Incoming Idle
Next State (RCC): RCC Idle
Next State (CHAN): No state change
Messages:
  Conc: None.
  RCC: Clear Indication (Silence).
  CCU: None.
Actions:
If the RCU considers a Subscriber Station to be in the RCC Idle state and a Call Accept token is received from the Subscriber Station, then the Subscriber Station is assumed to be confused. A Clear Indication message with a silence status is transmitted to the Subscriber Station, and the RCC State is left as RCC Idle.

This routine is also invoked when the concentrator indicates a call abandon due to the removal of ring. A Clear Indication message with a silence status is transmitted to the Subscriber Station and RCC state becomes RCC Idle.

Subscriber Station Onhook (s—onhk—a)
Current State: Ring
Token: Clear Request
Next State (RCC): RCC Idle
Next State (CHAN): No state change
Messages:
  Conc: None.
  RCC: Clear Indication (Silence).
  CCU: None.
Actions:
If the RCU considers a Subscriber Station to be in the RCC Idle state and a Call Accept token is received from the Subscriber Station, then the Subscriber Station is assumed to be confused. A Clear Indication message with a silence status is transmitted to the Subscriber Station, and the RCC State is left as RCC Idle.

This routine is also invoked when the concentrator indicates a call abandon due to the removal of ring. A Clear Indication message with a silence status is transmitted to the Subscriber Station and RCC state becomes RCC Idle.

Subscriber Station Onhook (s—onhk—a)
Current State: Ring
Token: Incoming Idle
Next State (RCC): RCC Idle
Next State (CHAN): No state change
Messages:
  Conc: None.
  RCC: Clear Indication (Silence).
  CCU: None.
Actions:
If the RCU considers a Subscriber Station to be in the RCC Idle state and a Call Accept token is received from the Subscriber Station, then the Subscriber Station is assumed to be confused. A Clear Indication message with a silence status is transmitted to the Subscriber Station, and the RCC State is left as RCC Idle.

This routine is also invoked when the concentrator indicates a call abandon due to the removal of ring. A Clear Indication message with a silence status is transmitted to the Subscriber Station and RCC state becomes RCC Idle.

Subscriber Station Page (s—page)
Current State: RCC Idle
Token: Incoming Ring
Next State (RCC): Page
Next State (CHAN): No state change
Messages:
  Conc: None.
  RCC: Send a Page message if the Subscriber Station.
  CCU: None.
Actions:
If an Incoming Ring token is received from the concentrator while the Subscriber Station is in the RCC Idle state, then this routine is invoked. The line appearance is mapped to a predetermined Page message, which is then transmitted to the appropriate Subscriber Station. A timer is set in case the Subscriber Station does not respond to the page. The RCC state is set to Page.

The following group of descriptions define the channel state transition routines which are called whenever a token is received from a CCU. They are listed in alphabetical order.

Channel Event Error (ch—err)
Current State: Chnl Idle, Syn Rin, Ring Sync Wait
Token: Sync Offhook, Sync Ring, Sync Data, Sync Onhook
Next State (RCC): No state change
Next State (CHAN): Chnl Idle
Messages:
  Conc: None.
  RCC: None.
  CCU: None.
Actions:
This routine is invoked when a channel event message is received from a channel that should not be active (i.e., events turned off). A change channel is sent to the CCU to make it idle and an error message is printed on the system console.

Channel Status (ch—stat)
Current State: Syn Ring, Syn Offhk
Token: Sync Ring, Sync Offhook
Next State (RCC): No state change
Next State (CHAN): No state change
Messages:
  Conc: None.
  RCC: None.
  CCU: None.
Actions:
This is a null transition routine invoked when a channel receives a Sync Ring or Sync Offhook token when it is already in the Syn Ring or Syn Offhk state respectively. It performs no operations and generates no messages, leaving the channel in the same state as it was previously. The routine is used to print out changes in link quality for a Subscriber Station.

Switch Hook Event Error (hook—err)
Current State: Offhk Syn Wait, Syn Offhk
Token: Sync Ring
Next State (RCC): Teardown
Next State (CHAN): Chnl Idle
Messages:
  Conc: Set circuit to idle state.
  RCC: None.
  CCU: Change Channel (ONHOOK) is sent to the CCU.
Actions:

This routine is invoked when the RCU receives a Sync Ring token for a Subscriber Station while the channel is Offhook.

Call teardown is performed by invoking the no_syn routine. An appropriate diagnostic message is printed.

No Channel Synchronization (no_syn)
Current State: Sync Ring, Sync Offhk, Offhk Sync Wait, Ring Sync Wait
Token: No Sync
Next State (RCC): Teardown
Next State(CHAN): Chnl Idle
Messages:
 Conc: Set circuit to idle state.
 RCC: None.
 CCU: Change Channel (ONHOOK) is sent to the CCU.
Actions:

This routine is invoked when a connection between the Base Station and the Subscriber Station is active and the connection is lost (due to fading, etc.). If the channel status is not Onhook, then a Change Channel message with an Onhook status is sent to the CCU. The concentrator loop circuit is idled. Since the RCU considers the connection broken, the channel is returned to the Chnl Idle state. The RCC state is set to Teardown.

Note that although receiving a No Sync message sets the channel state to Chnl Idle, it does not completely tear down a call. Call teardown is not complete until a Clear Request message is received by the RCU, causing the RCC state to become RCC Idle. A timer is set in case the Clear Request message is never received.

Subscriber Station Ring Trip (rng_offhk)
Current State: Syn Ring, Ring Syn Wait
Token: Sync Offhook
Next State (RCC): No state change
Next State (CHAN): Sync Offhk
Messages:
 Conc: None.
 RCC: None.
 CCU: Send Change Channel (OFFHOOK) to the CCU.
Actions:

This routine is activated when a Subscriber Station is in the ring state and either in or out of synchronization, and the RCU receives a message that the Subscriber Station is now in synchronization and has transitioned to Offhook. Normally, when a Sync Offhook token is received, the Subscriber Station is already in synchronization. The CCU is sent a Change Channel message with Offhook status, and the channel state is changed to Syn Offhk.

Subscriber Station Sync Offhook (syn_offhk)
Current State: Offhk Syn Wait
Token: Syn Offhook
Next State (RCC): No state change
Next State (CHAN): Syn Offhk
Messages:
 Conc: None.
 RCC: None.
 CCU: None.
Actions:

This routine generates no messages, it only causes a change in channel state to Sync Offhk.

Subscriber Station Sync Ring (syn_ring)
Current State: Ring Syn Wait
Token: Sync Ring
Next State (RCC): No state change
Next State (CHAN): Syn Ring Messages:
 Conc: None.
 RCC: None.
 CCU: None.
Actions:

This routine changes the channel state to Syn Ring.

The buffer 28 is connected to the remote ports of the remote concentrator 27 via line pairs 46-49 and to the channel modules 21 of the communication circuit 14 via lines 57 for directing the transmitted and received voice signals between the predetermined remote ports of the remote concentrator 27 and the predetermined communication channel time slots assigned to predetermined subscriber stations 51. The subscriber stations 51 are located remotely from the base station.

The buffer 28 includes a separate buffer unit, as shown in FIG. 2, for interfacing with each channel module 21 in the communication circuit 12. The timing generator 30 provides the channel interface module 32 with a clock signal CLK and four gate signals Gate 0, Gate 1, Gate 2, Gate 3 for defining four sequentially repetitive time slots in the assigned communication channel.

The transmitted voice signal line pairs 46, the received voice signal line pairs 47, and the the signalling data line pairs 48, 49 are connected between the remote ports of the concentrator 27 and the channel interface module 32.

The channel interface module 32 provides the clock and gate signals to the channel module 27 for defining the time slots assigned by the CCU 24.

The channel interface module 32 is connected to the VCU 23 in the corresponding channel module 21 in a predetermined manner for directing communications between line pairs 46, 47 carrying transmitted and received voice signals associated with a given subscriber station and a codec in the VCU 23 having the predetermined communication channel time slot assigned by the CCU 24 to the given subscriber station. The channel interface module is further connected to the VCU 23 for directing the signalling data between the signalling data line pairs 48, 49 and the the voice codec in the VCU having the common time slot assigned by the CCU 24 for communicating signalling data for all three subscriber stations associated with the given channnel module.

We claim:

1. A base station in a subscriber communication network for communicating between subscriber stations and an external network comprising a communication circuit in communication with a plurality of subscriber stations via a predetermined communication channel having multiple sequentially repetitive time slots, each time slot being assigned to a corresponding subscriber station;

a remote-connection processor in communication with said communication circuit and with an exchange for directing communications between said communication circuit and said exchange;

said exchange being in communication with said external communication network;

said remote-connection processor comprising a remote concentrator and said exchange comprising a central concentrator, said concentrators being in communication with each other via bit streams generated and received by each, bit streams transmitted by said central concentrator to said remote concentrator containing signals initiated by said external network and bit streams transmitted by said remote concentrator to said central concentrator containing signals initiated by said subscriber stations, said bit streams containing multiple sequentially repetitive time slots; and a separate, non-varying control channel for transmitting only control signals initiated by said subscriber stations.

2. The base station of claim 1 wherein said remote concentrator is provided with a plurality of ports and a buffer is connected to said ports by corresponding line pairs, said buffer acting to interface said remote concentrator with said communication circuit for directing signals between time slots in said communication channel and corresponding ports in said remote concentrator.

3. A base station according to claim 1, characterized by the exchange being remotely located from the communication circuit and the remote-connection processor.

4. A base station according to claim 3, characterized by means for transmitting the bit stream between the exchange and the communication circuit by microwave.

* * * * *